(12) United States Patent
Jeong et al.

(10) Patent No.: US 11,206,526 B2
(45) Date of Patent: Dec. 21, 2021

(54) METHOD AND APPARATUS FOR FLEXIBLY SUPPORTING SERVICES IN 5G WIRELESS COMMUNICATION SYSTEM

(71) Applicant: Samsung Electronics Co., Ltd., Suwon-si (KR)

(72) Inventors: Sangsoo Jeong, Suwon-si (KR); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/931,426

(22) Filed: May 13, 2020

(65) Prior Publication Data
US 2020/0367045 A1   Nov. 19, 2020

(30) Foreign Application Priority Data

May 13, 2019  (KR) .................. 10-2019-0055889
Jun. 5, 2019  (KR) .................. 10-2019-0066626
Oct. 2, 2019  (KR) .................. 10-2019-0122217

(51) Int. Cl.
*H04W 8/08*   (2009.01)
*H04W 76/11*  (2018.01)
*H04W 8/26*   (2009.01)

(52) U.S. Cl.
CPC .............. *H04W 8/08* (2013.01); *H04W 8/26* (2013.01); *H04W 76/11* (2018.02)

(58) Field of Classification Search
CPC ......... H04W 8/26; H04W 8/08; H04W 80/10; H04W 80/00; H04W 80/02; H04W 80/04; H04W 88/18; H04W 76/11; H04W 76/30; H04W 60/00; H04W 36/0011; H04W 36/0016; H04W 36/0022; H04W 36/0027;
(Continued)

(56) References Cited

U.S. PATENT DOCUMENTS 9,078,236 B2    7/2015  Chun et al.
10,911,990 B2 *  2/2021  Ying et al. ........ H04W 36/0022
(Continued)

FOREIGN PATENT DOCUMENTS

KR   10-2018-0105966 A   10/2018

OTHER PUBLICATIONS

Ericsson, "SMF context transfer", Change Request, 3GPP TSG-SA WG2 Meeting #133, May 13-17, 2019, S2-1905060, 3 pages.
(Continued)

*Primary Examiner* — Meless N Zewdu

(57) ABSTRACT

The disclosure relates to a communication technique for combining, with IoT technology, a $5^{th}$ generation (5G) communication system or a pre-5G communication system for supporting a higher data transmission rate after a $4^{th}$ generation (4G) system such as long-term evolution (LTE), and to a system therefor. The disclosure may be applied to intelligent services (e.g., a smart home, a smart building, a smart city, a smart car or connected car, healthcare, digital education, retail business, security and safety-related service, etc.), based on a 5G communication technology and an IoT-related technology. Various embodiments may provide a method for managing context of a terminal in a mobile communication system.

14 Claims, 14 Drawing Sheets

(58) Field of Classification Search
CPC ......... H04W 36/0033; H04W 36/0038; H04W 76/19; H04W 36/0044; H04W 12/60; H04W 76/00; H04W 88/00; H04W 88/02; H04W 88/08; H04W 88/14; H04W 64/00; H04W 64/003; H04W 28/0831; H04W 28/0835; H04W 28/0838; H04W 28/0842; H04W 48/18; H04W 76/10; H04W 12/61; H04W 12/63; H04W 36/0066; H04W 4/02; H04W 4/50; H04W 4/60; H04W 8/14; H04W 8/24; H04W 8/22; H04W 48/20; H04W 28/0819; H04W 72/1215; H04L 29/12; H04L 29/12009; H04L 29/12103; H04L 29/12754; H04L 61/3085; H04L 65/1066; H04L 29/14
See application file for complete search history.

(56) References Cited

U.S. PATENT DOCUMENTS

| | | | |
|---|---|---|---|
| 2014/0036773 A1* | 2/2014 | Fogbel | H04W 76/02 |
| 2017/0290052 A1 | 10/2017 | Zhang et al. | |
| 2018/0199398 A1 | 7/2018 | Dao et al. | |
| 2018/0270781 A1 | 9/2018 | Baek et al. | |
| 2019/0159227 A1* | 5/2019 | Talebi et al. | H04W 72/1263 |
| 2019/0261260 A1* | 8/2019 | Dao et al. | H04W 48/18 |
| 2020/0128450 A1* | 4/2020 | Wang | H04W 36/0033 |
| 2020/0221527 A1* | 7/2020 | Bharatia et al. | H04W 76/20 |
| 2020/0260525 A1* | 8/2020 | Gan et al. | H04W 80/10 |
| 2021/0022047 A1* | 1/2021 | Zong et al. | H04W 36/0016 |

OTHER PUBLICATIONS

Huawei, Hisilicon, "Update procedures to support PDB division", 3GPP TSG-SA WG2 Meeting #133, May 13-17, 2019, S2-1905521, 46 pages.
Nokia et al., "Correction of Control Plane CIoT 5GS Optimisation", 3GPP TSG-SA WG2 Meeting #133, May 13-17, 2019, S2-1905245, 19 pages.
Huawei et al., "Update Create SM context service operation for the I-SMF insertion and change", 3GPP TSG-CT WG4 Meeting #90, Apr. 8-12, 2019, C4-191519, 16 pages.
"3rd Generation Partnership Project; Technical Specification Group Services and System Aspects; Procedures for the 5G System; Stage 2 (Release 16)", 3GPP TS 23.502 V16.0.2 (Apr. 2019), 419 pages.
European Search Repod dated Sep. 21, 2020 in connection with European Patent Application No. 20 17 4213, 12 pages.
International Search Report dated Aug. 11, 2020 in connection with International Patent Application No. PCT/KR2020/006236, 3 pages.

* cited by examiner

METHOD AND APPARATUS FOR FLEXIBLY SUPPORTING SERVICES IN 5G WIRELESS COMMUNICATION SYSTEM

CROSS-REFERENCE TO RELATED APPLICATIONS

This application is based on and claims priority under 35 U.S.C. § 119 to Korean Patent Application No. 10-2019-0055889 filed on May 13, 2019, Korean Patent Application No. 10-2019-0066626 filed on Jun. 5, 2019, and Korean Patent Application No. 10-2019-0122217 filed on Oct. 2, 2019 in the Korean Intellectual Property Office, the disclosures of which are herein incorporated by reference in their entirety.

BACKGROUND

1. Field

The disclosure relates to a technique for managing an identifier of a terminal and status information (context) thereof in a mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The 5G system is considering supports for more various services as compared to the conventional 4G system. For example, the most representative service may include a ultrawide band mobile communication service (enhanced mobile broad band (eMBB)), a ultrahigh reliable/low latency communication service (ultra-reliable and low latency communication (URLLC)), a massive device-to-device communication service (massive machine type communication (mMTC)), and a next-generation broadcast service (evolved multimedia broadcast/multicast service (eMBMS)). A system providing the URLLC service may be referred to as a URLLC system, and a system providing the eMBB service may be referred to as an eMBB system. The terms "service" and "system" may be interchangeably used.

Among these services, the URLLC service that is a new service under consideration in the 5G system in contrast to the existing 4G system requires to meet ultrahigh reliability (e.g., packet error rate of about 10-5) and low latency (e.g., about 0.5 msec) conditions as compared to the other services. To meet these strict conditions required therefor, the URLLC service may need to apply a shorter transmission time interval (TTI) than the eMBB service, and various operating scheme employing the same are now under consideration.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

An embodiment proposes a structure in which data processed by network functions (NFs) is separated and stored in order to increase communication efficiency and improve customer service quality in a 5G system. In addition, an embodiment proposes an identifier (ID) processing method to solve an ID conflict issue between NFs, which may occur when introducing the above structure.

The technical subjects pursued in the disclosure may not be limited to the above mentioned technical subjects, and other technical subjects which are not mentioned may be clearly understood, through the following descriptions, by those skilled in the art to which the disclosure pertains.

In accordance with an aspect of the disclosure, a method performed by an access and mobility management function (AMF) entity in a wireless communication system is provided. The method includes receiving, from a first session management function (SMF) entity, a first message to transfer a session management (SM) context to a second SMF entity; transmitting, to the second SMF entity, a second message for requesting the second SMF entity to receive the SM context from the first SMF entity; starting a timer upon transmitting the second message; and receiving, from the second SMF entity, a third message as a response to the second message before expiring the timer.

In one embodiment, the method further comprises determining that a SM context transfer procedure is failed in case that the timer expires before receiving the third message.

In one embodiment, the first message includes information on indicating of transferring the SM context.

In one embodiment, the method further comprises receiving, from a terminal, a service request message before receiving the third message; and delaying a transaction related to the SM context until receiving the third message.

In one embodiment, the method further comprises receiving, from an another AMF entity, a user equipment (UE) context transfer request message before receiving the third message; and delaying a transaction related to the SM context until receiving the third message.

In one embodiment, the first message comprises a Nsmf_PDUSession_SMContextStatusNotify message, the second message comprises a Nsmf_PDUSession_CreateSMContext request message, and the third message comprises a Nsmf_PDUSession_CreateSMContext response message.

In one embodiment, the transmitting the second message further comprising: selecting the second SMF entity based on the first message.

The disclosure also provides an access and mobility management function (AMF) in a wireless communication system. The AMF entity includes: a transceiver; and a controller configured to: receive, from a first session management function (SMF) entity via the transceiver, a first message to transfer a session management (SM) context to a second SMF entity, transmit, to the second SMF entity via the transceiver, a second message for requesting the second SMF entity to receive the SM context from the first SMF entity, start a timer upon transmitting the second message, and receive, from the second SMF entity via the transceiver, a third message as a response to the second message before expiring the timer.

In the case of applying an embodiment, it is possible to freely distribute throughput by sharing context of a terminal between NFs and to support customer services without sacrificing quality by enabling the service provided by a faulty NF to be taken over by another NF. In addition, in the case of applying an embodiment, IDs used by NFs sharing context with each other may be determined and managed according to the system capacity/performance and customer service characteristics, thereby preventing service errors or degradation of customer service quality caused by conflict of IDs.

Effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards.

Meanwhile, in describing embodiments, a node/NF having functions of separating, storing, and retrieving UE information (UE context) processed/managed by an NF will be called a "context storage" that has a concept including an unstructured data storage function (UDSF) that is an NF for storing/sharing unstructured data and a context transfer storage function (CTSF) that is an NF for storing/transmitting context.

Meanwhile, in the disclosure, the term "service" will be used to refer to an "NF service" in which a specific communication device (or NF) processes a request by another communication device (or NF), and a "customer service" will be separately used in order to specifically indicate a service provided to an end-user.

A new system structure and protocol were required to support various services of 5G, and then 3GPP decided to introduce a new technology called "service-based architecture (SBA)".

Figure 1:
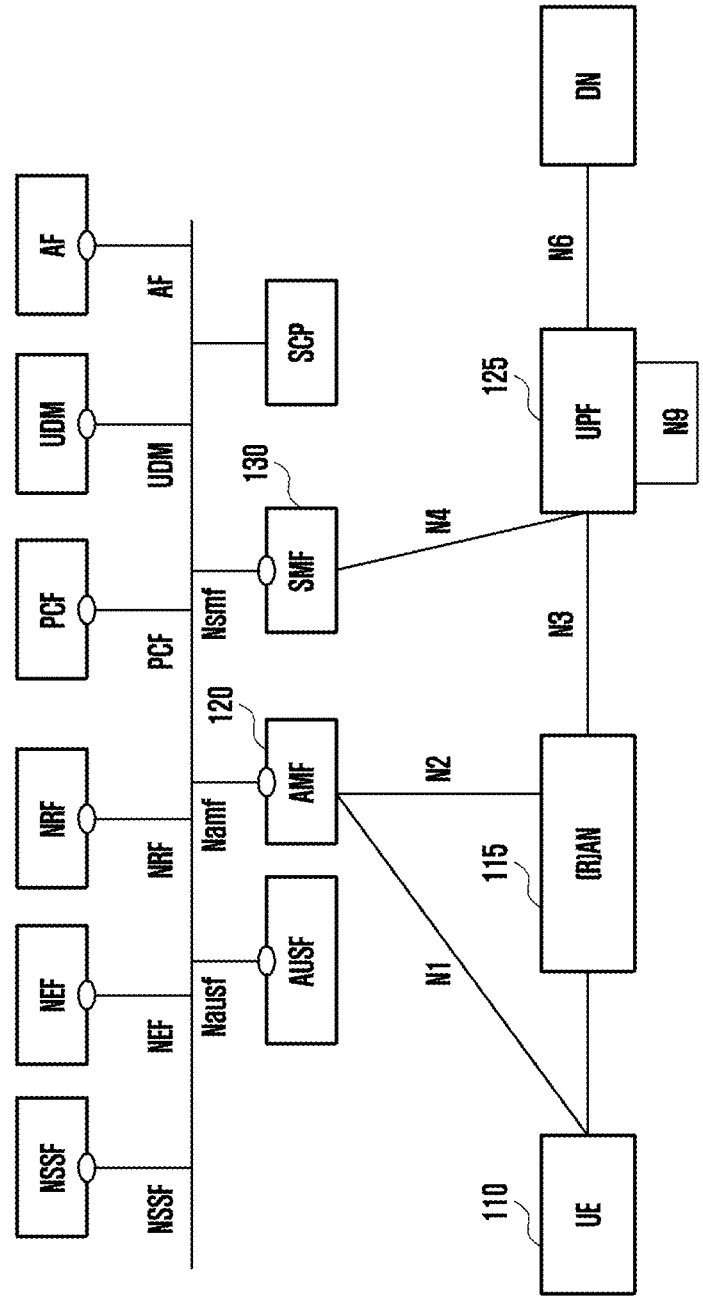
FIG. 1 illustrates a diagram of the structure of an SBA-based 5G system according to an embodiment.

FIG. 1 illustrates a diagram of the structure of an SBA-based 5G system according to an embodiment.

Referring to FIG. 1, an access and mobility management function (AMF) 120 is a network function (NF) that manages access and mobility of a UE 110 in a wireless network. A session management function (SMF) 130 is an NF that manages a session for the UE 110, and session information includes QoS information, charging information, and information on packet processing. A user plane function (UPF) 125 is an NF that processes user plane traffic and is controlled by the SMF 130. Although not shown in FIG. 1, the 5G system may include a UDSF, and the UDSF is an NF that stores unstructured data. Any type of data may be stored or retrieved at a request by the NF.

Figure 2:
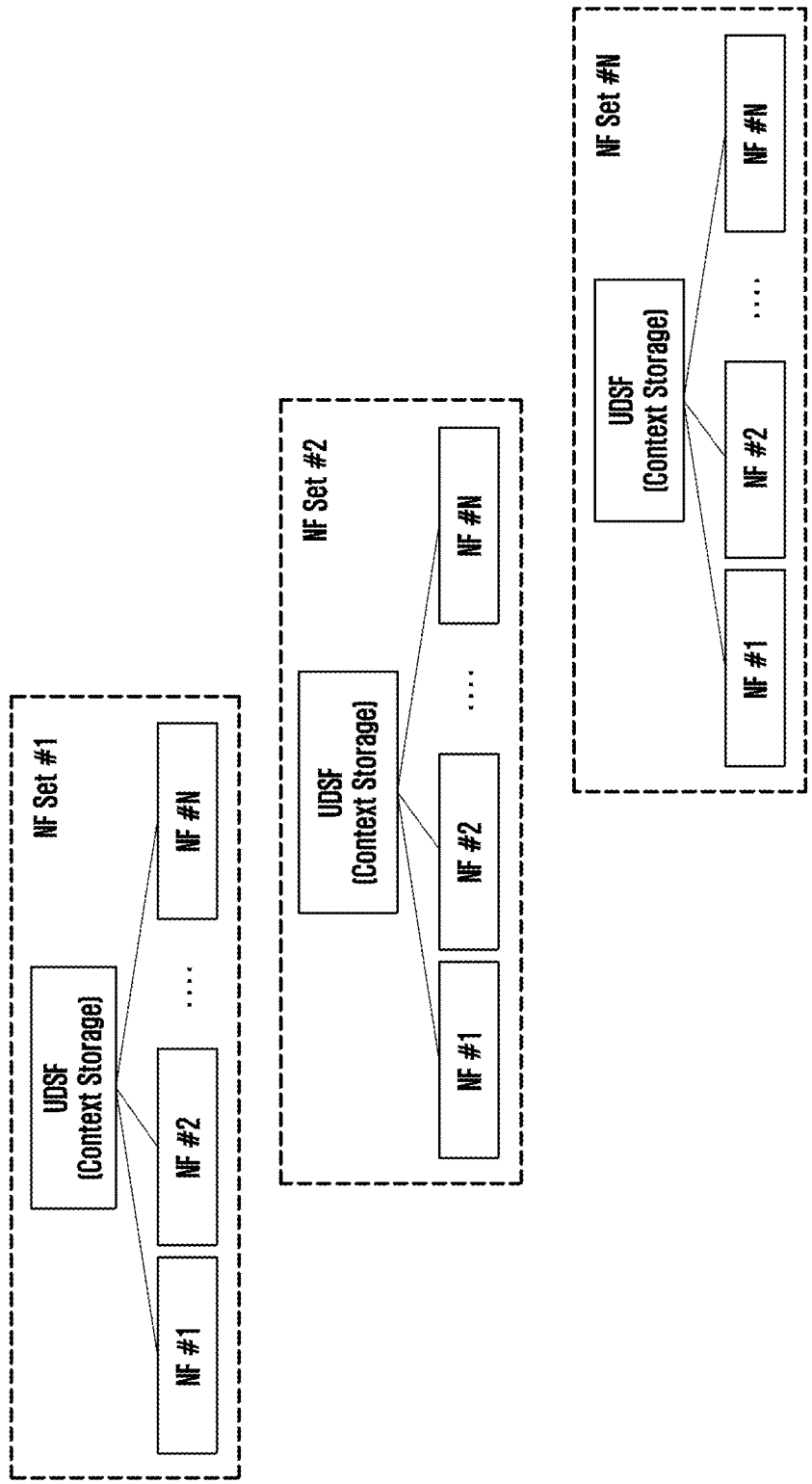
FIG. 2 illustrates a diagram of the separation structure of NFs and context according to an embodiment.

FIG. 2 illustrates a diagram of the separation structure of NFs and context according to an embodiment.

Referring to FIG. 2, in an embodiment, data (UE context) in the NF is separated from the NF and stored in a separate context storage, and a set of NFs that may share and use the same is referred to as an "NF set". Depending on an implementation environment, a specific NF may be operated/managed in the form of an NF instance, and the subject matter of the disclosure may be applied to an environment of managing and operating any one of the NF and the NF instance. In addition, the NF may be replaced with an NF service in the case of the operation in units of NF services, instead of implementation/realization in units of NFs. Accordingly, the term "NF" in the disclosure may encompass an NF instance, an NF service, and an NF service instance. If multiple NF sets coexist, distinct identifiers or names may be assigned to the respective NF sets in order to distinguish therebetween, and even if NFs in the NF set operate by sharing context with each other, the respective NFs may be assigned with different identifiers/names for management/operation thereof.

Figure 3:
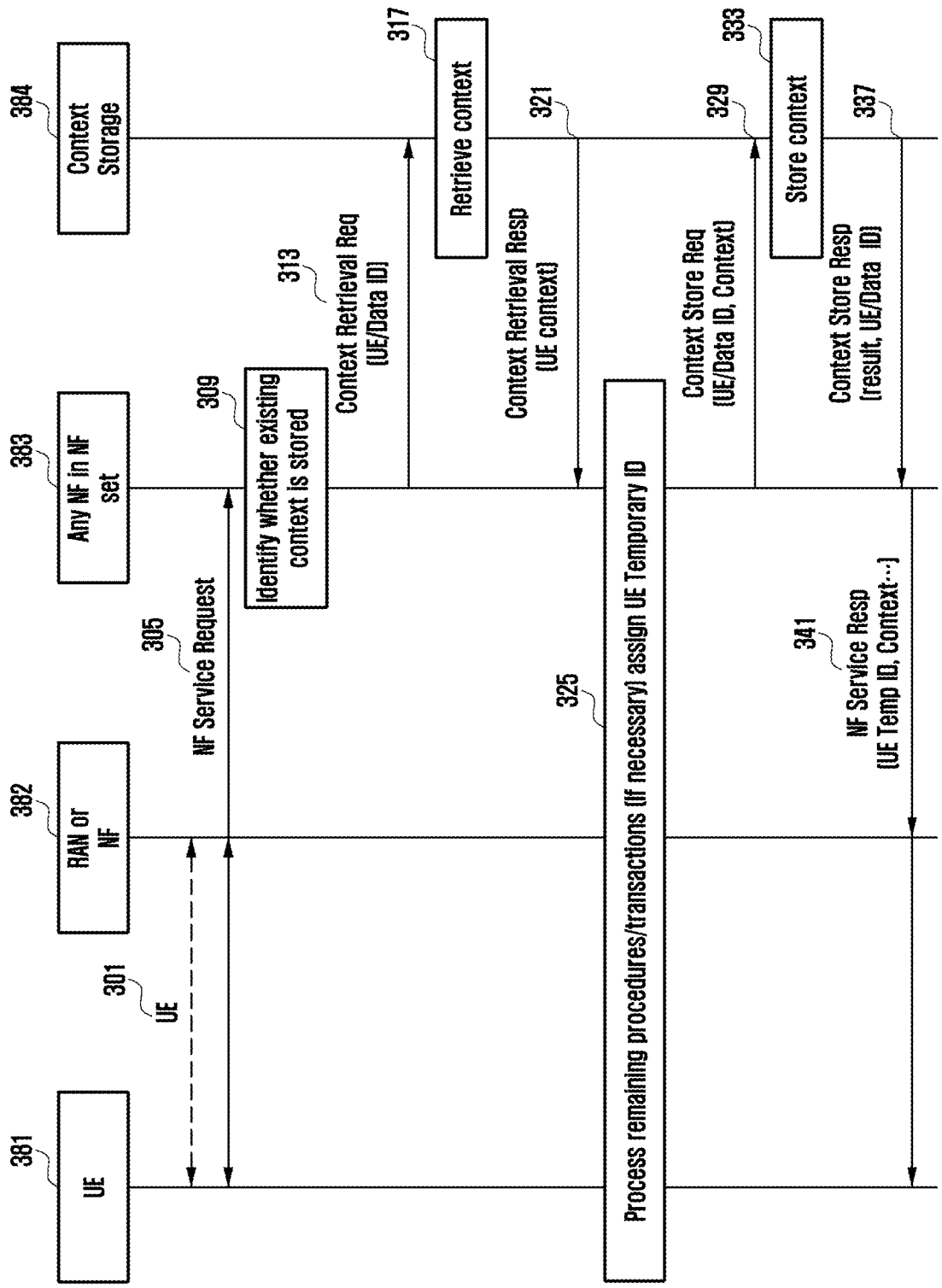
FIG. 3 illustrates a diagram of an example of the operation of a 5G system including a terminal, a base station, and a core according to an embodiment.

FIG. 3 illustrates a diagram of an example of the operation of a 5G system including a terminal, a base station, and a core according to an embodiment.

Referring to FIG. 3, step 301 may be performed in the case where a requester 382 making a request to any NF 383 included in an NF set for a service is a radio access network (RAN) (base station), and a radio resource control (RRC) connection is established between a UE 381 and the RAN 382 in order to transmit and receive signaling/data using radio resources.

In step 305, the requester 382 makes a request to the NF 383 for a specific NF service. If the requester is the RAN 382, the target NF 383 may be an AMF. In this case, the requester 382 may specify and transmit a receiver 383 of the request. If the request is transmitted to the NF set without specifying a specific NF, any NF in the NF set may receive the request.

In step 309, the receiving NF 383 performs an operation according to the NF service request. The receiving NF 383 identifies whether or not the requested NF service requires UE context that is pre-cached in the NF set, that is, in the NF or the context storage 384. If information is pre-cached in the NF, the cached information may be directly used, so that steps 313 to 321 may be omitted.

If the UE context cached in the context storage 384 is required, the NF 383 makes a request to the context storage 384 for retrieving the context in step 313. In this case, if the context storage 384 is a UDSF, a "Nudsf_UnstructuredData-Management_Query service (request)" may be used for the context retrieval request, and the request message may include a data identifier for identifying data to be retrieved. If the NF 383 is aware of a correct data identifier, the identifier capable of identifying data may include a value corresponding thereto. Otherwise, the identifier may include an identifier of a specific UE. The identifier of a specific UE (subscriber) includes a subscription permanent ID (SUPI) (an IMSI or NAI type) or a unique temporary identifier in a specific NF set {pre-assigned as one of a 5G-globally unique temporary identifier (GUTI), an internet protocol (IP) address, a tunnel endpoint ID (TED), a flow ID, an application/service ID, a charging ID, and the like}.

In step 317, the context storage 384 searches for data to be retrieved according to the request by the NF 383 and transmits, to the NF 383, a response thereto in step 321. If the request is valid, that is, if the context storage 384 is able to retrieve valid context using the identifier included in the request message, the response message transmitted in step 321 includes the corresponding context. In this process, the context storage 384 may consider the identifier included in the request (a data identifier or a UE/subscriber identifier) and the type of the NF 383 making the request (a type such as AMF, SMF, etc.) in order to check the validity of the request by the NF 383 and find the context to be retrieved. In the case where the context storage 384 is a UDSF, the response corresponds to a response of "Nudsf_UnstructuredDataManagement_Query" service. If the request in step 313 is made using an identifier of a UE (subscriber), instead of using a specific data identifier, and if a specific data identifier is pre-assigned to the context storage 384, the response transmitted in step 321 includes the data identifier. In addition, upon receiving the response, the NF 383 may store the data identifier, and may use the corresponding data identifier when making a request to the context storage 384 in the future. According to this, it is possible to reduce the time taken for the context storage 384 to search for the stored context using the UE (subscriber) identifier or to reduce the load on the context storage 384 to do so.

In step 325, the procedure/transaction requested in step 305 is processed using the corresponding context. In the embodiment, the procedure/transaction includes a processing operation in a specific NF, and further includes an operation of transmitting/receiving a message and requesting services by interworking with another NF according thereto.

In the case where the UE context is required to be updated or new UE context is required to be stored in the context storage 384 by a request, the NF 383 makes a request to the context storage 384 for storing/updating context in step 329, and the request includes identifiers of the new context and data or identifiers of the context and data to be updated. If the context storage 384 is a UDSF, the corresponding operation may be performed using services "Nudsf_UnstructuredDataManagement_Create (storage)" and "Nudsf_UnstructuredDataManagement_Update (update)". In the case of update, if the NF 383 is explicitly aware of the data identifier or receives the same, the NF 383 may perform updating the UE context using the corresponding data identifier. In addition, in the case of "create", the NF 383 may transmit, to the context storage 384, the UE (subscriber) identifier and the context to be stored.

In step 333, the context storage 384 may store the context transmitted from the NF 383, and if a new data identifier is required to be created (generated) (in the case of using a UE or subscriber identifier in step 329), the context storage 384 may create a new data identifier, and may transmit the same to the NF 383 through a response in step 337.

The NF 383 and other nodes 381 and 382 process the remaining procedures/transactions in step 341. If a new temporary ID (one or more of a 5G-GUTI, a TED, and an IP address) for a UE (subscriber) is assigned through the corresponding procedure/transaction, the ID is transmitted to the UE 381, and the UE 381 stores the same for use in subsequent procedures.

The above embodiment has described a method of grouping multiple NFs into an NF set and separating/sharing contexts. When performing a process of providing connectivity to a user through a 5G system, various types of temporary identifiers are assigned. Although the embodiments are described based on the following temporary identifiers, the subject matter of the disclosure may be applied to the case of assigning/managing any type of temporary identifier used in the communication system.

5G-GUTI: This is a globally unique temporary identifier and includes an identifier GUAMI of an AMF serving the UE and an MME temporary mobile subscriber identity (M-TMSI) assigned to the UE. In one AMF set, the M-TMSI must be uniquely assigned to each UE.

TEID: This is an endpoint ID for distinguishing GTP {general packet radio system (GPRS) tunneling protocol} tunnels for transmitting packets between communication equipments (between a base station and an NF or between NFs) (especially, UPF), and is required to be uniquely assigned within the IP used by the NF.

UE IP address: This is an IP address assigned to a UE when the UE uses IP communication, and must be uniquely assigned to each UE within one IP domain.

Flow ID: This is an identifier assigned to identify and control specific traffic flow.

Application ID: This is an identifier assigned to identify a specific service application.

Analytic ID: This is an identifier assigned to collect/analyze information on an NW, and may be used in a N/W data analytic function (NWDAF).

Background data transfer reference ID: This is an identifier used to transmit data to a UE in the background.

Charging data record (CDR) ID: This is an identifier used to control specific charging information.

If the NF assigns a temporary identifier to a specific UE (subscriber), uniqueness must be assured according to a certain condition, and if the uniqueness is not satisfied, an error occurs, thereby degrading the quality of service or requiring an error recovery process. Unlike the system in which all the resources inside one NF are consumed, in the structure described in the above embodiment, NFs in an NF set share context, and an NF serving a single UE (subscriber) may be changed at any time in the same set. In such a system, since the entire pool of temporary identifiers is also shared by the NFs, there may be a problem in that two NFs simultaneously assign one temporary identifier to two UEs (subscribers).

Figure 4:
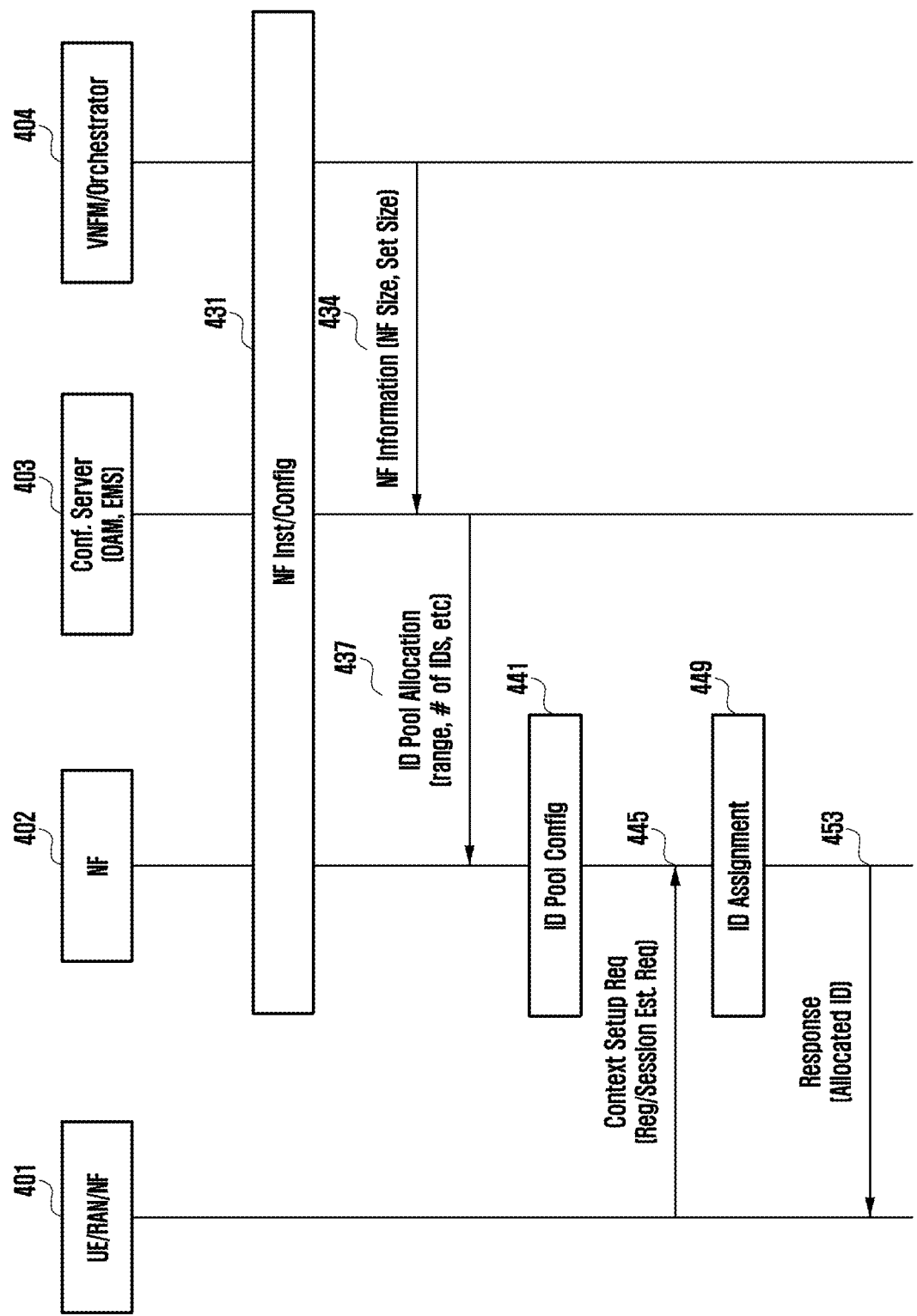
FIG. 4 illustrates a diagram of another example of the operation of a 5G system (a terminal, a base station, and NFs) according to an embodiment.

FIG. 4 illustrates a diagram of another example of the operation of a 5G system (a UE, a base station, and NFs) according to an embodiment.

Referring to FIG. 4, reference numeral 401 denotes an interworking node that may request/trigger NF services in a specific NF, and may be a UE, a RAN (base station), or another NF.

Reference numeral 402 represents an NF for providing a communication function, and includes an NF defined in the 3GPP standard and a network equipment similar thereto. If a specific NF is implemented/operated in the form of an instance, the NF may be replaced with an NF instance. The NF may be replaced with an NF service in the case of the operation in units of NF services, instead of implementation/realization in units of NFs.

A configuration server (conf. server) 403 is a server providing a function of managing/configuring communication equipments (a RAN, an NF, etc.), and is generally called an "element management system (EMS)" or an "operation and maintenance (OAM) system". A virtualized network function manager (VNFM)/orchestrator 404 is a system that configures/manages NFs in a virtualized system. In the disclosure, an embodiment will be described on the assumption that two systems are separated, but the two systems may be integrated into one, and in this case, the exchange of messages between the two systems may be omitted, or may be processed through an internal procedure.

In step 431, the NF 402 is initially installed or configured.

In step 434, the VNFM/orchestrator 404 informs the configuration server 403 of the size of the NF (typically corresponding to the maximum capacity) (a value such as the number of concurrently processible subscribers or the number of sessions, a value indicating the relative capacity, or the like) and the size of the NF set (the number of NFs included in the NF set, the maximum capacity of the entire set, or the like).

In step 437, the configuration server 403 may divide the entire pool of temporary identifiers shared by the NF set by the received size of the NF/NF set, thereby determining an available identifier to be used for each NF, and may transmit information assigned to each NF 402. Available identifier information may be transmitted to the NF 402 according to the type thereof, and the configuration server 403 may transmit, to the NF 402, a start value of the temporary identifier, a form of the total number or a range of the temporary identifiers (values indicating a start to an end), or a list of all assigned identifiers. When managing the temporary identifier, the configuration server 403 may reserve some sections in consideration of changes in the NW configuration (the size of an NF, the size of a set, etc.) in the future, and may perform initial assignment using the remaining sections.

In step 441, the NF 402 stores a pool of temporary identifiers to be used by the NF 402 according to the received information.

The UE (or RAN or another NF) 401 makes a request to the NF 402 for a specific NF service in step 445, and if a temporary identifier is required to be assigned to each UE (subscriber), the NF 402 may assign an identifier from the stored pool in step 449. In step 453, the NF 402 may respond to the UE (or RAN or another NF) 401.

The above embodiment may be utilized in the case where multiple NFs are included in an NF set. If the number of NFs in the NF set is dynamically changed (if a scaling-size changes due to malfunction or load), or if the size of each NF is changed, it is difficult to change the pool of identifiers to conform to the situation.

Figure 5:
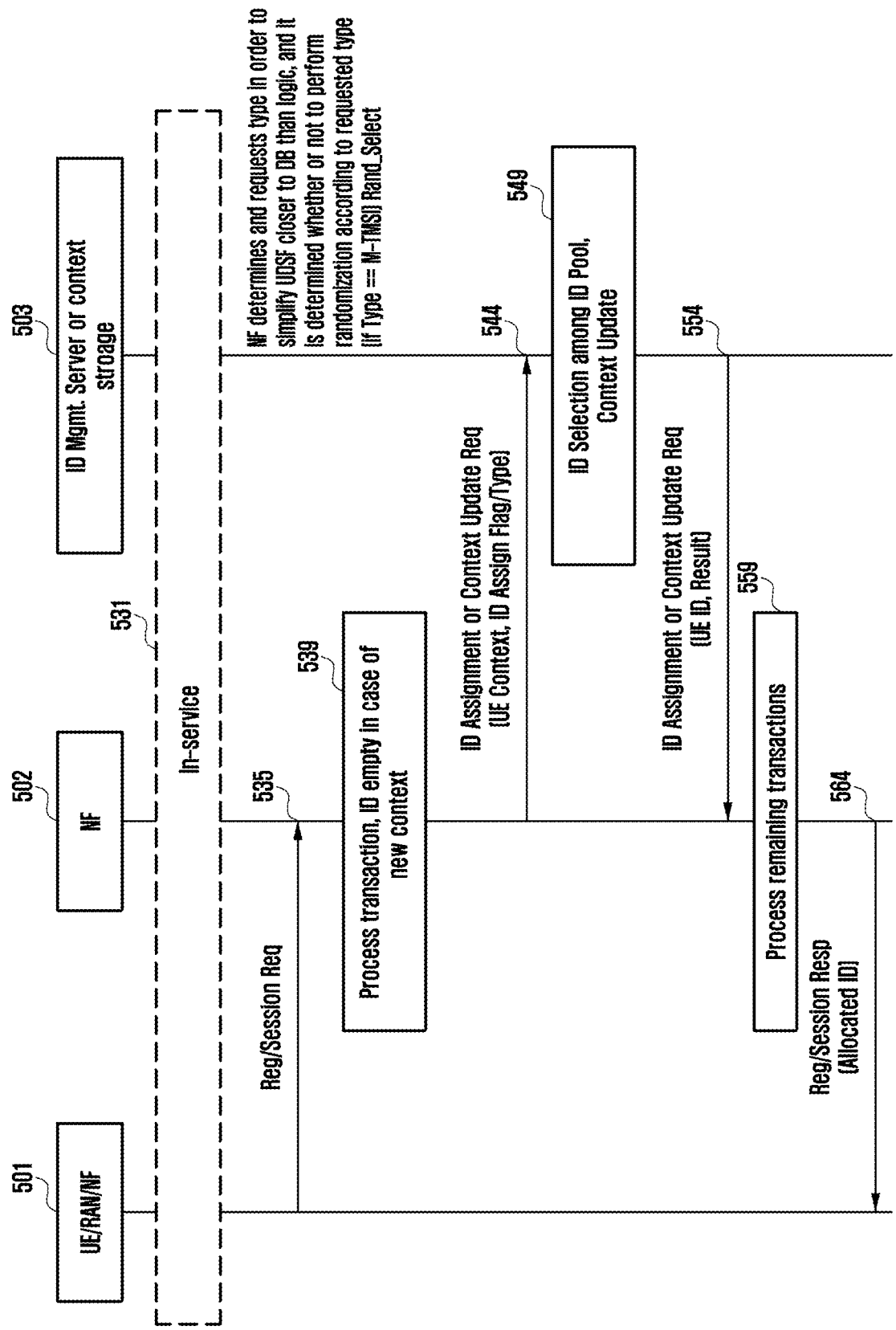
FIG. 5 illustrates a diagram of an example of effectively managing temporary identifiers even in the structure in which a 5G system is dynamically changed according to an embodiment.

FIG. 5 illustrates a diagram of an example of effectively managing temporary identifiers even in the structure in which a 5G system is dynamically changed according to an embodiment.

Referring to FIG. 5, reference numeral 501 denotes an interworking node that may request/trigger NF services in a specific NF, and may be a UE, a RAN (base station), or another NF.

Reference numeral 502 represents an NF for providing a communication function, and includes an NF defined in the 3GPP standard and a network equipment similar thereto. If a specific NF is implemented/operated in the form of an instance, the NF may be replaced with an NF instance. The NF may be replaced with an NF service in the case of the operation in units of NF services, instead of implementation/realization in units of NFs.

An ID management server 503 is a server providing a function of managing an identifier pool of all NFs. The ID management server 503 may be configured as a separate function (NF), or may be configured as a detailed function provided by the context server while being integrated with the context server described in the above embodiment.

Step 531 means that the interworking node (UE/RAN/NF) 501 and the NF 502 are in the state capable of exchanging messages with each other and performing interworking operations.

In step 535, the UE or interworking NF 501 makes a request to the NF 502 for an NF service. The request for an NF service by the interworking NF 501 may be made in the process of processing a service by a request of a UE, a request of a RAN, or the internal operation of an NF and a request by another NF.

In step 539, the NF 502 processes the received transaction and determines whether new context needs to be created or a temporary identifier needs to be assigned.

In step 544, the NF 502 may transmit, to the ID management server 503, a request for assigning an ID or creating/updating context. In this case, the NF 502 may make a request to the ID management server 503 for a temporary identifier to be assigned to the UE (subscriber). The request message may include information on the type of temporary identifier to be used. The type information may include one or more of the above-described identifiers such as an M-TMSI, a 5G-GUTI, a GTP TEID, and an IP address. In addition, the NF 602 may make an explicit request to the ID management server 503 for whether or not to apply randomization when assigning the temporary identifier. If the ID management server 503 supports services of a UDSF, the request/response may be processed using the services described in the above embodiment in FIG. 2.

In step 549, the ID management server 503 stores/updates the context if a request for processing context is received, and assigns the requested temporary identifier. If the requested temporary identifier requires randomization (e.g., in the case of the 5G-GUTI or the M-TMSI), or if separate randomization is explicitly requested, the ID management server 503 applies randomization when assigning the temporary identifier.

In step 554, the ID management server 503 transmits, to the NF 502, the assigned temporary identifier and, in the case where a request for processing context is received, a response to the context processing.

In step 559, the NF 502 processes the remaining procedures/transactions using the assigned temporary identifier.

In step 564, the assigned temporary identifier is transmitted to the interworking node (UE/base station or interworking NF) 501, and the interworking node 501 receiving the temporary identifier stores the same for use in the subsequent procedures.

Figure 6:
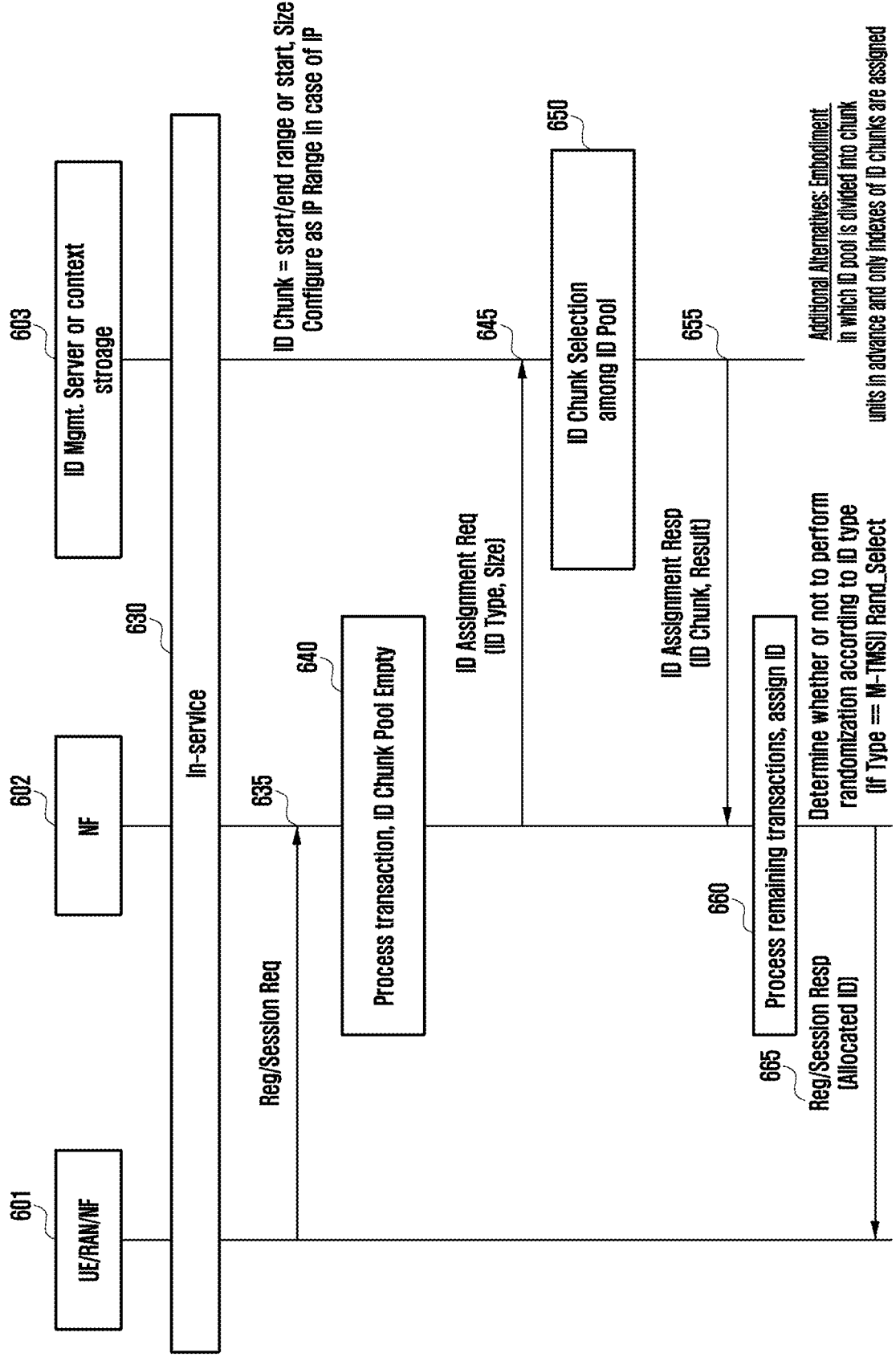
FIG. 6 illustrates a diagram of a method of dividing a pool of identifiers shared by an NF set into chunk units and assigning, managing, and collecting the same in units of chunks, instead of requesting and assigning temporary identifiers each time a transaction is processed according to another embodiment.

FIG. 6 illustrates a diagram of a method of dividing a pool of identifiers shared by an NF set into chunk units and assigning, managing, and collecting the same in units of chunks, instead of requesting and assigning temporary identifiers each time a transaction is processed according to another embodiment.

The assignment method in units of chunks is effective because signaling between NFs for management of identifiers is able to be reduced and because collisions is able to be prevented while each NF freely assigns an identifier within a chunk.

Referring to FIG. 6, reference numeral 601 denotes an interworking node that may request/trigger NF services in a specific NF, and may be a UE, a RAN (base station), or another NF.

Reference numeral 602 represents an NF for providing a communication function, and includes an NF defined in the 3GPP standard and a network equipment similar thereto. If a specific NF is implemented/operated in the form of an instance, the NF may be replaced with an NF instance. The NF may be replaced with an NF service in the case of the operation in units of NF services, instead of implementation/realization in units of NFs.

An ID management server 603 is a server providing a function of managing an identifier pool of all NFs. The ID management server 603 may be configured as a separate function (NF), or may be configured as a detailed function provided by the context server while being integrated with the context server described in the above embodiment. The ID management server 603 may be configured for each specific NF set, or may be configured to support multiple NF sets.

Step 630 means that the interworking node (UE/RAN/NF) 601 and the NF 602 are in the state capable of exchanging messages with each other and performing interworking operations.

In step 635, the UE or interworking NF 601 makes a request to the NF 602 for an NF service. The request for an NF service by the interworking NF 601 may be made in the process of processing a service by a request of a UE, a request of a RAN, or the internal operation of an NF and a request by another NF.

In step 640, the NF 602 processes the received transaction and determines whether or not a temporary identifier needs to be assigned. Step 635 does not necessarily precede step 640, and if assignment of the ID pool is required in an initiation process for processing a service request or in the general operation situation, the NF 602 may start from step 640.

In step 645, the NF 602 may transmit a request for ID assignment to the ID management server 603. In this case, the NF 602 may make a request to the ID management server 603 for chuck assignment of a temporary identifier to be assigned to the UE (subscriber). The request message may include information on the type of temporary identifier to be used and a chunk size (that is, the number of IDs to be assigned). The type information may include one or more of the above-described identifiers such as an M-TMSI, a 5G-GUTI, a GTP TEID, and an IP address. In the case where the ID management server 603 is configured to simultaneously support multiple NF sets, the NF 602 may inform the ID management server 603 of the name or information of the NF set to which the NF 602 belongs using the request message. In addition, the NF 602 may make an explicit request to the ID management server 603 for whether or not to apply randomization when assigning the temporary identifier. If the ID management server 603 supports services of a UDSF, the request/response may be processed using the services described in the above embodiment in FIG. 2, and the assignment of the ID chunk may be implemented through an operation of creating specific context. Alternatively, a separate service for making an explicit request to the UDSF for ID assignment may be used.

In step 650, the ID management server 603 assigns the requested temporary identifier. If the requested temporary identifier requires randomization (e.g., in the case of the 5G-GUTI or the M-TMSI), or if separate randomization is explicitly requested, the ID management server 603 applies randomization when assigning the temporary identifier. The ID management server 603 may accept the full size of the requested chunk, thereby assigning the temporary identifier, or may assign a smaller chunk. Information on the chunk includes an identifier of the chunk, which will be used for management (return or the like) in units of chunks in the future.

In step 655, the ID management server 603 may transmit, to the NF 602, the assigned temporary identifier chunk. The ID management server 603 may further transmit, to the NF 602, information on success or failure and information on the chunk size.

In step 660, the NF 602 processes the remaining procedures/transactions using the assigned temporary identifier.

In step 665, the assigned temporary identifier is transmitted to the interworking node (UE/base station or interworking NF) 601, and the interworking node 601 receiving the temporary identifier stores the same for use in the subsequent procedures.

Meanwhile, in another embodiment, the operation of assigning/managing IDs in units of chunks may include an operation of exchanging information on the chunk in advance between the NF 602 and the ID management server 603 and transmitting only an identifier (or index) of the chunk in the actual operation such as assignment/return, as well as an operation of specifying and transmitting information on the identifiers included in the chunk (start values of identifiers, the number of identifiers, the range of identifiers, etc.) when performing chunk assignment as described in the above embodiment.

Figure 7:
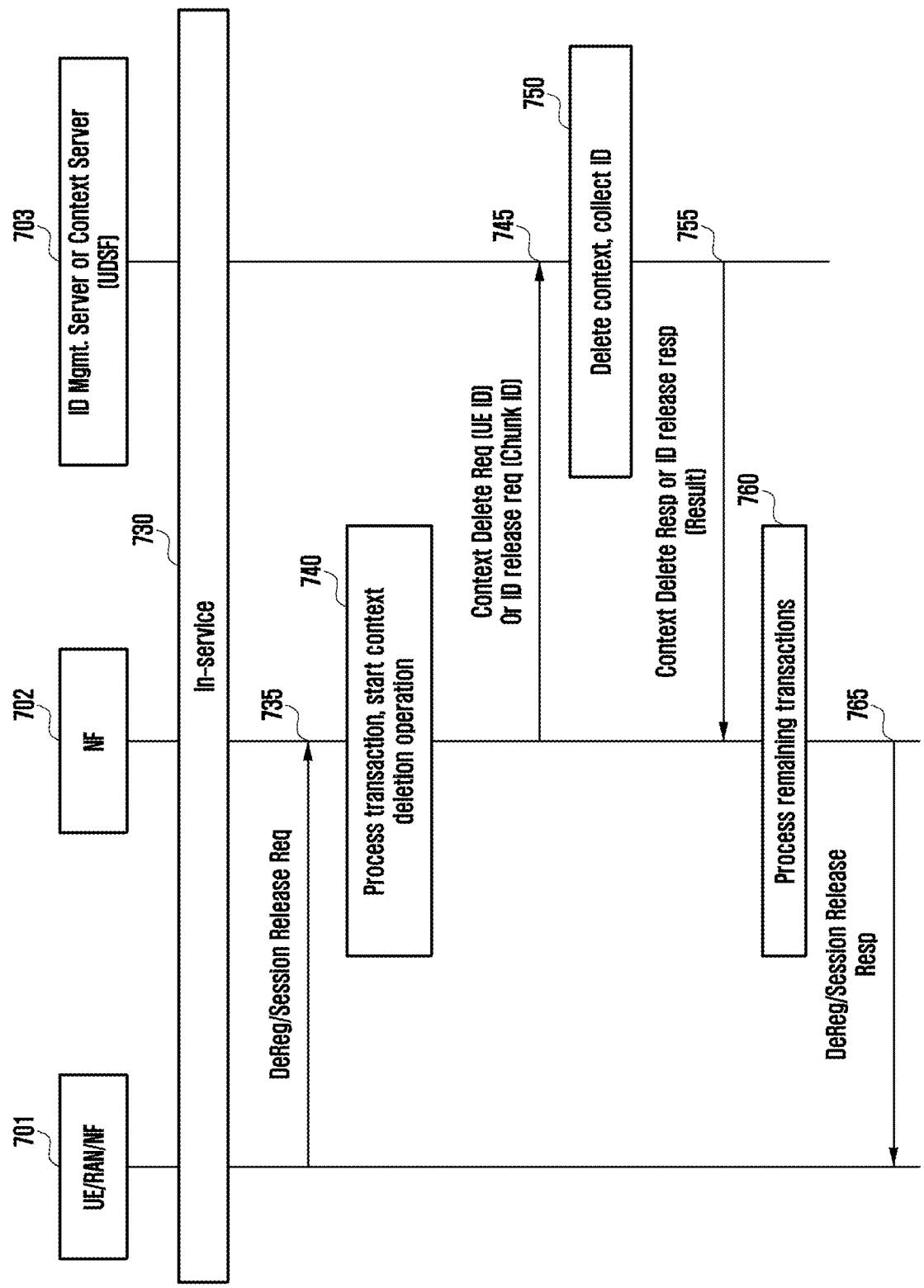
FIG. 7 illustrates a diagram of a process in which a specific NF returns an assigned ID of which the use is terminated according to an embodiment.

FIG. 7 illustrates a diagram of a process in which a specific NF returns an assigned ID of which the use is terminated according to an embodiment.

Referring to FIG. 7, reference numeral 701 denotes an interworking node that may request/trigger NF services in a specific NF, and may be a UE, a RAN (base station), or another NF.

Reference numeral 702 represents an NF for providing a communication function, and includes an NF defined in the 3GPP standard and a network equipment similar thereto. If a specific NF is implemented/operated in the form of an instance, the NF may be replaced with an NF instance. The NF may be replaced with an NF service in the case of the operation in units of NF services, instead of implementation/realization in units of NFs.

An ID management server 703 is a server providing a function of managing an identifier pool of all NFs. The ID management server 703 may be configured as a separate function (NF), or may be configured as a detailed function provided by the context server while being integrated with the context server described in the above embodiment. The ID management server 703 may be configured for each specific NF set, or may be configured to support multiple NF sets.

Step 730 means that the interworking node (UE/RAN/NF) 701 and the NF 702 are in the state capable of exchanging messages with each other and performing interworking operations.

In step 735, the UE or interworking NF 701 makes a request to the NF 702 for an NF service. The request for an NF service by the interworking NF 701 may be made in the process of processing a service by a request of a UE, a request of a RAN, or the internal operation of an NF and a request by another NF. In this case, the requested service is characterized in that the use of a specific temporary identifier is terminated, and the use of the identifiers, such as an M-TMSI (or 5G-GUTI) during a de-registration process, a GTP TEID and an IP address during a session release process, and the like, may also be terminated. Use of the temporary identifiers and deletion of the context may be performed after the lapse of a predetermined time, instead of immediately performing the same, depending on the implementation/configuration.

In step 740, the NF 702 processes the received transaction and determines whether or not the temporary identifier needs to be returned. Step 735 does not necessarily precede step 740, and if an ID is required to be returned when a timer expires or in the general operation situation, the NF 702 may start from step 740.

In step 745, the NF 702 may transmit a request for returning the ID to the ID management server 703. In this case, the NF 702 may make a request to the ID management server 703 for chuck return of a temporary identifier to be assigned to the UE (subscriber). The request message may include a chunk identifier of the temporary identifier to be used. If management of IDs is performed simultaneously with management of context, the return of the temporary identifier assigned to a specific UE (subscriber) may be made simultaneously with deletion of the context for the specific UE (subscriber). If the ID management server 703 supports services of a UDSF, the request/response may be processed using the services described in the above embodiment in FIG. 2, and the assignment of the ID chunk may be implemented through an operation of deleting specific context. Alternatively, a separate service for making an explicit request to the UDSF for deletion of the ID may be used.

The ID management server 703 switches to the state in which the requested temporary identifier is no longer used in step 750, and the ID management server 703 transmits, to the NF 702, a response to the return in step 755. If the ID is returned through processing of context, the ID management server 703 may transmit a response to deletion of context.

In step 760, the NF 702 processes the remaining procedures/transactions.

In step 765, a notification of deletion of the temporary identifier is transmitted to the node (the UE/base station or the interworking NF) 701 through the procedure of processing.

Figure 8:
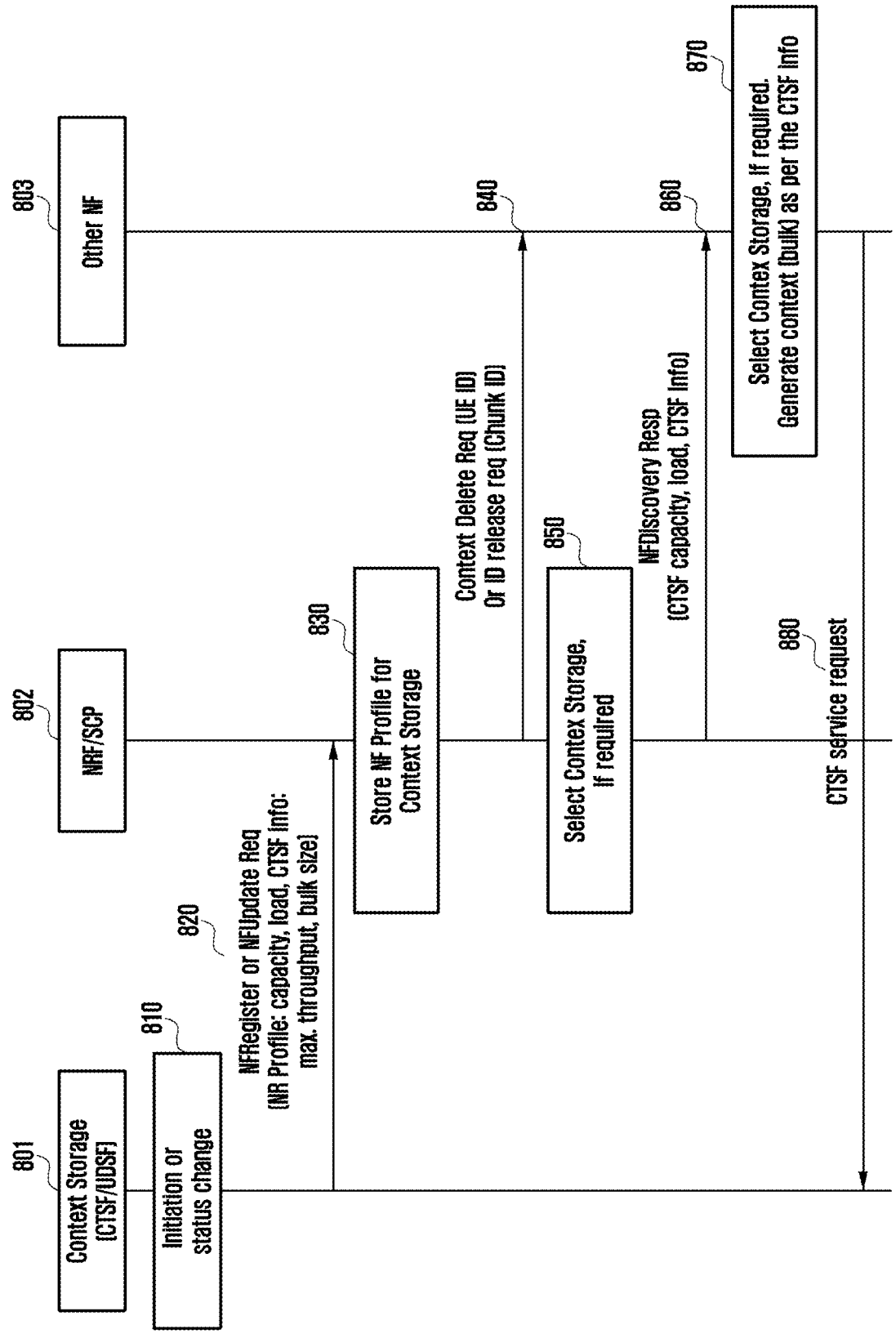
FIG. 8 illustrates a diagram of a method of selecting a target NF in consideration of the capacity of an NF receiving context when providing a service by exchanging context between context storages or NFs according to an embodiment.

FIG. 8 illustrates a diagram of a method of selecting a target NF in consideration of the capacity of an NF receiving context when providing a service by exchanging context between context storages or NFs according to an embodiment.

Referring to FIG. 8, a context storage 801 represents a function of storing/transmitting data (UE context) created/managed by an NF in order to provide a communication service, and includes a CTSF, a UDSF, and the like. A network repository function (NRF)/service communication proxy (SCP) 802 is an NF that assists discovery, selection, and message routing for providing services between NFs using connection information and status information between NFs.

In step 810, the context storage 801 may start a new service, or may change status.

In step 820, the context storage 801 may newly register its own information (NF profile) in the NRF/SCP 802, or may update the same (when the status/configuration is changed). In this case, the profile of the context storage 801 may include at least one of the maximum capacity that can be provided by the context storage, the current load status, and the throughput representing the number of contexts that can be processed (transmitted/received) during a unit time, the size of the context that can be stored by one transaction, and the like. In the case where the profile of the context storage 801 represents the maximum capacity, the load status, the throughput, and the size, the profile may be expressed using a relative value calculated based on the maximum value. Alternatively, the maximum capacity, the load status, the throughput, and the size may be expressed as absolute values. For example, the maximum capacity may be expressed as a combination of a specific context type (e.g., SM context) and the maximum number of acceptable contexts, and the number of contexts that can be processed at a time may be expressed as a combination of a specific context type and the maximum number of processible contexts. For the operation in step 820, the context storage 801 may transmit, to the NRF/SCP 802, a message such as an "NRRegister request" or an "NFUpdate request".

In step 830, the NRF/SCP 802 may store the capacity, the status information, and the like (the NF profile) received from the context storage 801.

In step 840, if the NF 803 has insufficient information stored, another NF (SMF, AMF, etc.) 803 may transmit, to the NRF/SCP 802, a discovery/selection request of the context storage in order to make a request for storing and transmitting context. The discovery/selection request may include information stating that the NF service to be requested is storage of context (context create, update, or push) or transmission thereof (context transfer) even though the explicit target to be discovered is the context storage (the CTSF or the UDSF). The request in step 840 may be an "NFDiscovery request message".

In step 850, the NRF/SCP 802 may select the context storage (or a set of candidates) 801 according to the request, and may transmit, to the NF 803 that made a request, a response thereto in step 860. In this case, the response may include necessary information (a combination of the identifier, access address, maximum capacity, current load status, throughput, simultaneous transmission capability, and the like of the context storage) among the NF profile of the context storage 801, which is received and stored in step 820, and the configuration and meaning of the detailed information may be the same as those described in step 820 above. The response transmitted in step 860 may be an "NFDiscovery response message".

In step 870, the NF 803 may store the information received in step 860, and if a response capable of specifying one context storage is received, the NF 803 may select the corresponding context storage. In addition, if candidates of multiple context storages to be a target are received, the NF 803 may select one of the candidates. In this case, when performing the selection, the NF 803 may select the context storage 801 capable of effectively providing services in consideration of the information (the maximum capacity, the load status, etc.) received in step 860. Even when the NF 803 requests context-related services to the selected context storage 801, the information received in step 860 may be considered. In particular, when the context storage 801 provides a limited amount of transmission, the NF 803 may create a request so as not to exceed the amount of transmission, and may create a request such that the size of the context (the number of contexts, the size of the context, etc.) included in the request does not exceed the limit.

In step 880, the NF 803 transmits a service request to the context storage 801. Thereafter, the NF 803 receives a response as a result of processing from the context storage 801, and another procedure may be triggered, of which a detailed description will be omitted in the embodiment. In step 880, the NF 803 may transmit, to the context storage 801, a CTSF service request message for the service request.

Figure 9:
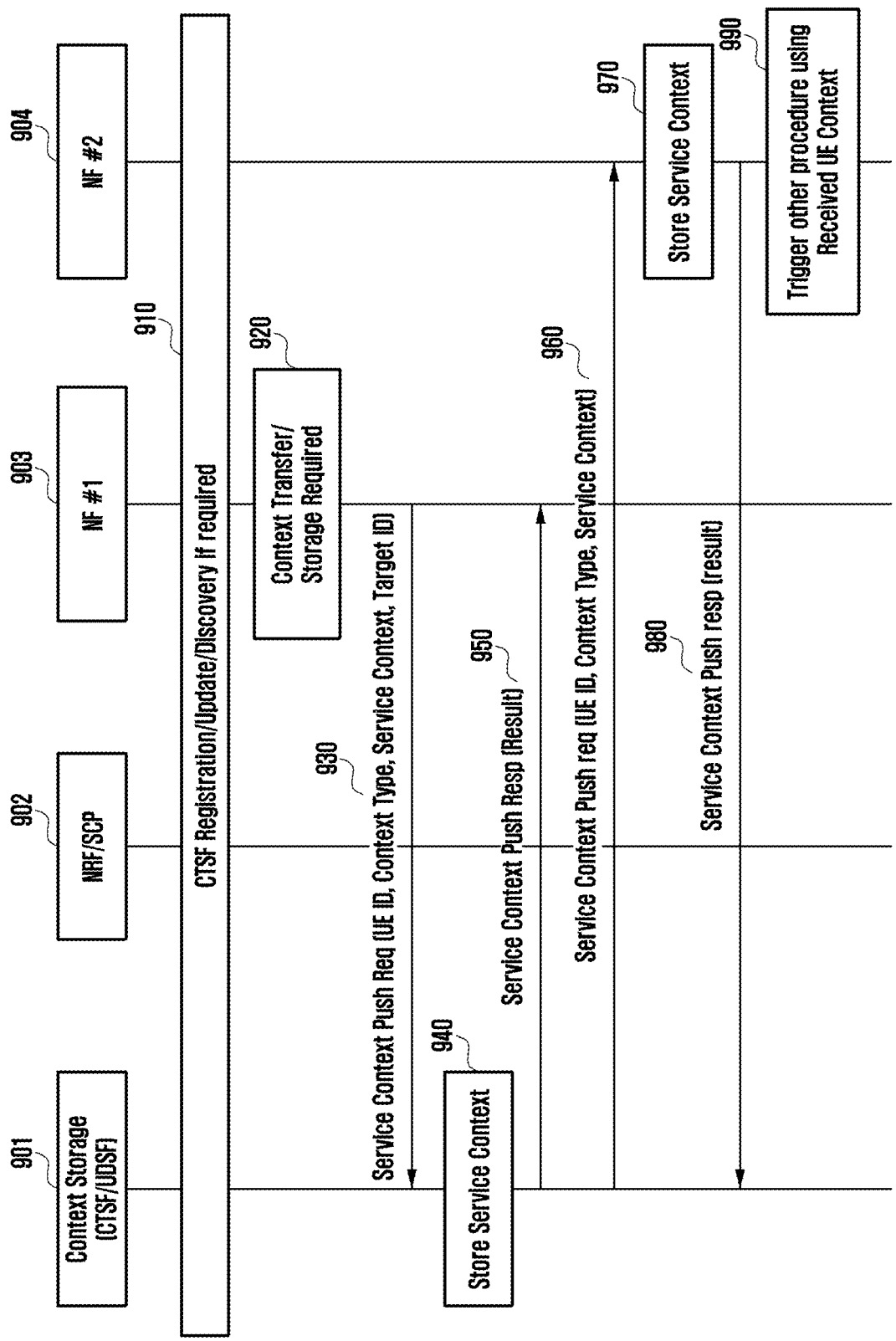
FIG. 9 illustrates a diagram of a method of managing context in an NF according to an embodiment.

FIG. 9 illustrates a diagram of a method of managing context in an NF according to an embodiment.

Referring to FIG. 9, in step 910, NFs 903 and 904 and a context storage NF 901 may perform registration, discovery, and selection processes to request/receive mutual service provision.

In step 920, NF #1 (903) may determine that an NF change operation is required.

In step 930, NF #1 (903) transmits context to the context storage (CTSF/UDSF) 901, and transmits a service request for changing the NF. The service used in this case may be a service context push request, and the request message may include at least one of an identifier (context ID) capable of identifying the target context for context transfer and change of an NF, the type of context, an identifier of a target UE (subscriber), and an identifier of a target PDU session (if the context type is SM context). If the operation of the request to be transmitted to the context storage 901 includes changing the NF, as well as storing the context, the request message may further include an identifier of the NF to be changed. In this case, in order to select the NF to be changed, if backup NFs are pre-configured, NF #1 (903) may select one of the backup NFs. Otherwise, NF #1 (903) may select an NF from the same NF set. If the NF is not required to be changed, step 960 and steps subsequent thereto may not be performed.

In step 940, the context storage 901 stores the context according to the request, and transmits, to the NF #1 (903), a response thereto in step 950. If a request for changing the NF is further requested in step 930, the response in step 950 to the service request received in step 930 may be transmitted after receiving the result of changing the NF (step 980). The response in step 950 may be a service context push response.

In the case where the context storage 901 receives a service request including the change of an NF in step 930, the context storage 901 transmits the context to the target NF (NF #2) 904 to be changed in step 960. The service used in this case may be a service context push request, and the request message may include at least one of an identifier (context ID) capable of identifying the target context for context transfer and change of the NF, the type of context, an identifier of a target UE (subscriber), and an identifier of a target PDU session (if the context type is SM context). In addition, the request message may include information indicating whether or not the context push service request is intended for context storage or whether or not the context push service request includes change of an NF.

The NF #2 (904) may store the received context in step 970, and may transmit a response as a result thereof to the context storage 901 in step 980. In this case, the response message in step 980 may be a service context push response.

Then, in step 990, NF #2 (904) performs other procedures/transactions according to reception of context and change of an NF. The order of steps 970, 980, and 990 may be changed with each other.

Table 1 below shows the type and structure of the context when the NF for transmitting and receiving context is an AMF in an embodiment.

TABLE 1

| Category | Services | Description | Data key |
| --- | --- | --- | --- |
| AMContext | AMF Context Transfer | Identifies an Access & Mobility Management Context that may be transferred from a Source to a target AMF directly, or via the context storage (e.g., CTSF) | SUPI |

As shown in Table 1, the AM context refers to the context created/managed by an AMF, and denotes data that is shared between AMFs, transmitted and received directly for changing an AMF, or transmitted through a context storage (CTSF). A data key for managing and browsing the AM context and indicating a specific AM context represents the identifier of a subscriber (SUPI).

Figure 10:
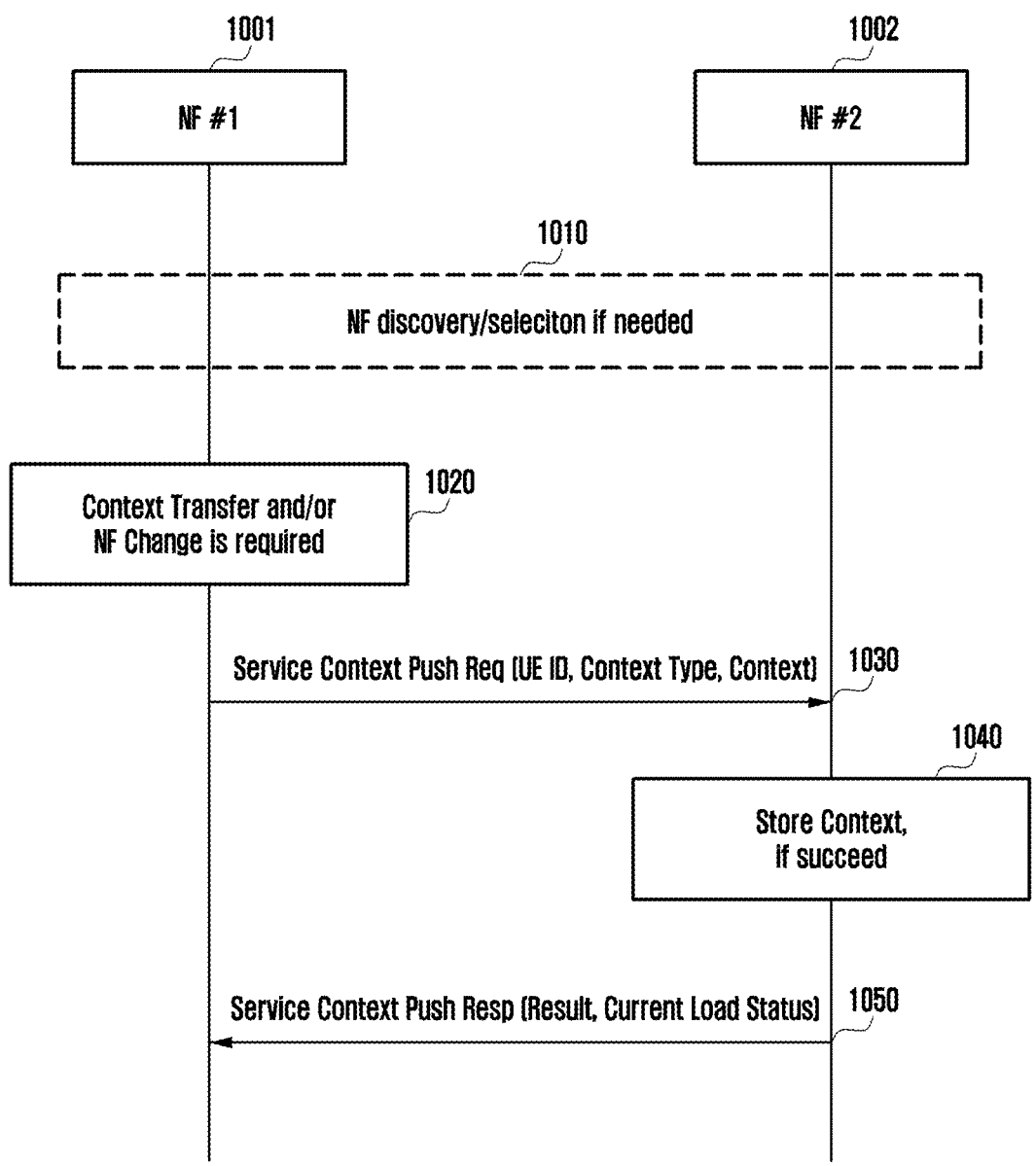
FIG. 10 illustrates a diagram of a method for preventing malfunction and overload due to context transfer and change of an NF according to an embodiment.

FIG. 10 illustrates a diagram of a method for preventing malfunction and overload due to context transfer and change of an NF according to an embodiment.

Referring to FIG. 10, in step 1010, an NF 1001 may perform a process of discovering/selecting another NF 1002.

In step 1020, NF #1 (1001) determines that context transfer to another NF (NF #2) 1002 is required or that an NF is required to be changed along therewith, and in step 1030, NF #1 (1001) makes a request to a target NF (NF #2) 1002 for a context push service. The message requesting the context push service may include at least one of an identifier (context ID) capable of identifying the target context for context transfer and change of an NF, the type of context, an identifier of a target UE (subscriber), and an identifier of a target PDU session (if the context type is SM context). In addition, the request message for a context push service may include information indicating whether or not the context push service request is intended for context storage or whether or not the context push service request includes changing an NF. The request message may be a service context push request.

In step 1040, NF #2 (1002) may store the received context, and if the NF is required to be changed, may perform other procedures/transactions according to change of the NF.

In step 1050, NF #2 (1002) transmits a result of the service request to NF #1 (1001), and the response message may include information on the current load status of the NF and information for processing the context, as well as the result. More specifically, the response message may include at least one of the maximum capacity that can be provided by NF #2 (1002), the current load status, and the throughput indicating the number of contexts that can be processed (transmitted/received) during a unit time, and the size of the context that can be stored through a single transaction. The response message may be a service context push response. In addition, NF #1 (1001) receiving the response may store the information included in the response, and may consider the information when selecting a target or requesting processing of context in the case where context transfer or change of an NF is required in the future.

Figure 11:
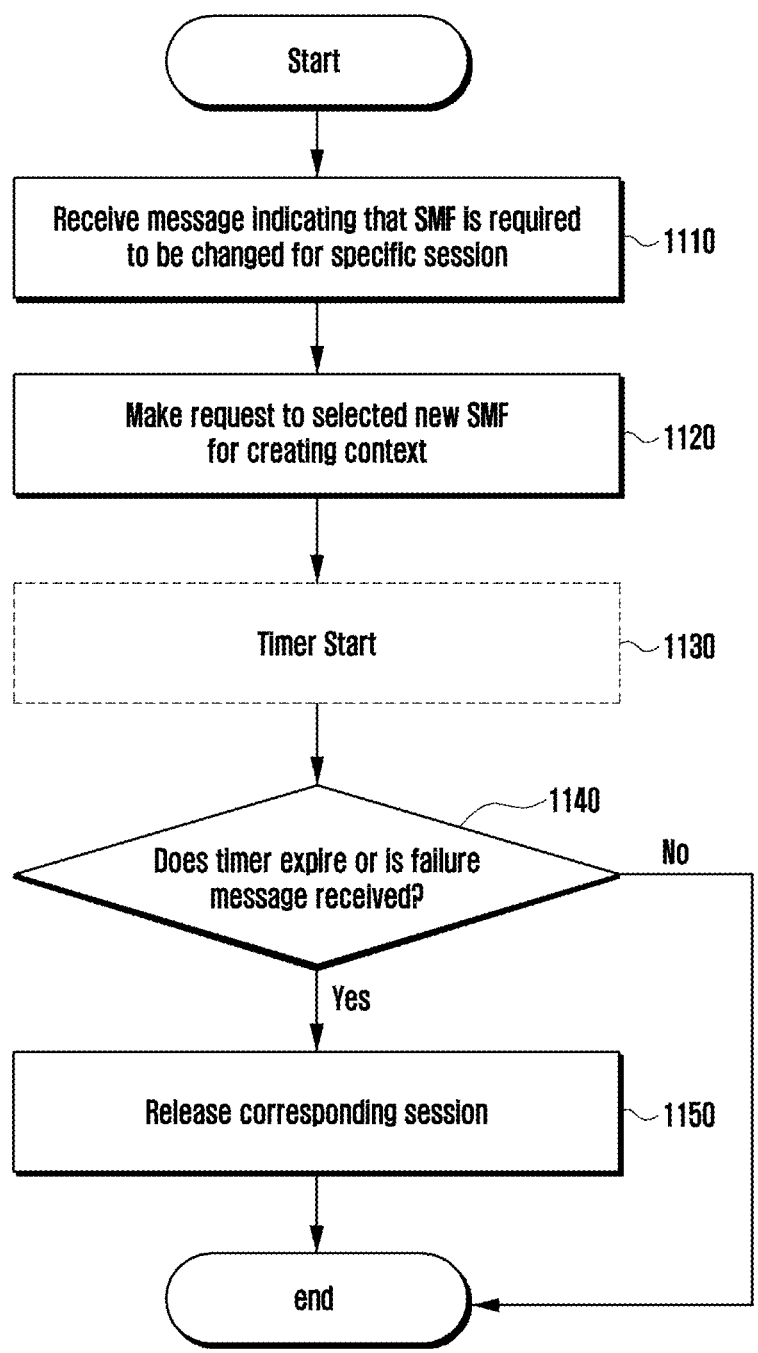
FIG. 11 illustrates the detailed operation of an AMF according to an embodiment.

FIG. 11 illustrates the detailed operation of an AMF according to an embodiment. In this embodiment, it is assumed that a pre-operation for transmitting the context of a UE to another SMF is triggered by a specific SMF.

Referring to FIG. 11, in step 1110, an AMF receives, from an SMF (referred to as an "old SMF"), a message indicating that it is necessary to transmit the context for a specific UE and session to another SMF. This message may be "Nsmf_PDUSession_SMContextStatusNotify", and in order to receive the message, the AMF may perform subscription to the old SMF in advance in order to receive a notification of a change in status.

In step 1120, the AMF may select a target SMF (referred to as a "new SMF") using the information contained in the request message from the SMF. In addition, the AMF may transmit, to the new SMF, a request for receiving the context for the target UE and session from the old SMF. The message used in this case may be "Nsmf_PDUSession_CreateSMContext request".

In step 1130, the AMF may optionally start a timer for determining whether or not the session-related context transmission of the SMF and processing thereof are successful.

If a timer is set in step 1130, and if a response is not received from the new SMF until the set timer expires, the AMF may determine that the context processing procedure requested to the new SMF has failed in step 1140. Alternatively, if the AMF explicitly receives, from the new SMF, a message indicating that the context processing procedure has failed, the AMF may recognize that the procedure has failed. Alternatively, the AMF may recognize whether or not the procedure is successful through implementation inside the AMF or a method of receiving information from other NFs or OAM.

If it is determined that the context process requested to the new SMF has failed, the AMF may determine that a corresponding session has been released, and may perform a procedure of releasing a PDU session in step 1150. Alternatively, the AMF may inform the old SMF that the context processing has failed, so that the old SMF may perform subsequent procedures.

Figure 12:
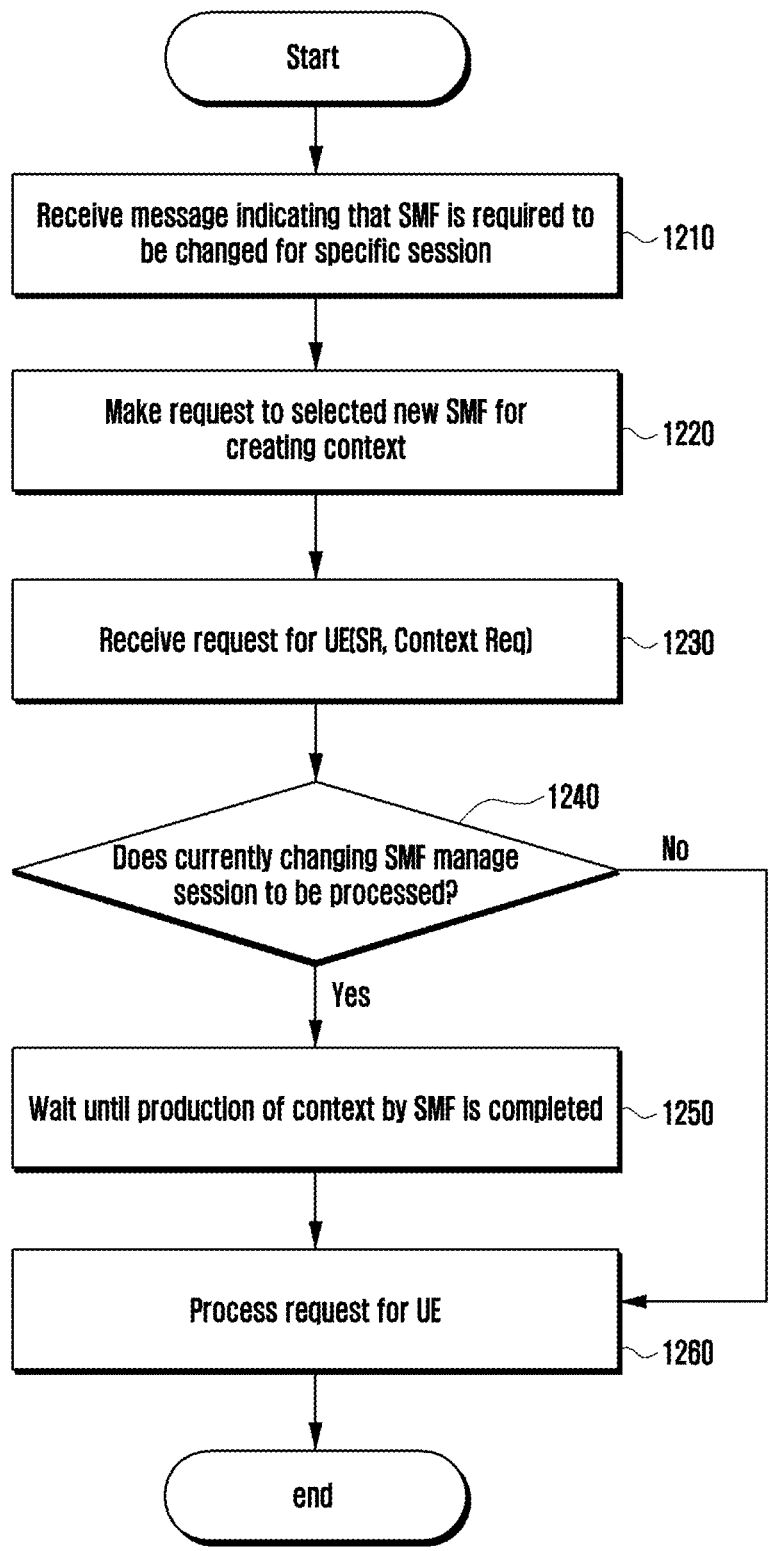
FIG. 12 illustrates the detailed operation of an AMF according to an embodiment.

FIG. 12 illustrates the detailed operation of an AMF according to an embodiment. In this embodiment, it is assumed that a pre-operation for transmitting the context of a UE to another SMF is triggered by a specific SMF.

Referring to FIG. 12, in step 1210, an AMF receives, from an SMF (referred to as an "old SMF"), a message indicating that it is necessary to transmit the context for a specific UE and session to another SMF. This message may be "Nsmf_PDUSession_SMContextStatusNotify", and in order to receive the message, the AMF may perform subscription to the old SMF in advance in order to receive a notification of a change in status.

In step 1220, the AMF may select a target SMF (referred to as a "new SMF") using the information contained in the request message from the SMF. In addition, the AMF transmits, to the new SMF, a request for receiving the context for the target UE and session from the old SMF. The message used in this process may be "Nsmf_PDUSession_CreateSMContext request". Thereafter, the AMF may optionally start a timer for determining whether or not the session-related context transmission of the SMF and processing thereof are successful.

In step 1230, before receiving the message indicating that the context processing procedure requested to the new SMF in step 1220 is completed, the AMF may receive a separate request for the corresponding UE (for example, a context transfer request received from another AMF during the service request or registration process or the like). In general, this may be a request stemming from the mobility of the UE, or may be a request caused by the occurrence of a service (transmission of a call or data) in the UE in an idle state.

In step 1240, the AMF determines whether or not the target UE and session include the currently changing SMF in processing the request received in step 1230. More specifically, if the operation to be processed for the UE is a service request, the AMF determines whether or not the currently changing SMF belongs to the SMF providing services to the PDU sessions to be processed for the UE. If the operation to be processed for the UE is a context transfer request made by another AMF, the AMF determines whether or not the currently changing SMF belongs to the SMF managing the session of the UE. If the related SMF includes the currently changing SMF, the process proceeds to step 1250. Otherwise, the process proceeds to step 1260.

In step 1250, the AMF delays processing of the request received in step 1230 until a message indicating that a context creation process is completed is received from the new SMF. That is, the AMF stores the request received in step 1230 and waits. In this step, if the AMF receives, from the new SMF, a message informing that the context creation process is completed, the AMF updates the UE context (including the address of the SMF) according thereto and proceeds to step 1260. If the AMF sets a timer in step 1220, and if the AMF does not receive a response from the new SMF until the set timer expires, the AMF may determine that the context processing procedure requested to the new SMF has failed. Alternatively, if the AMF explicitly receives, from the new SMF, a message indicating that the context processing procedure has failed, the AMF may recognize that the procedure has failed. Alternatively, the AMF may recognize whether or not the procedure is successful through implementation inside the AMF or a method of receiving information from other NFs or OAM. If it is determined that the context process requested to the new SMF has failed, the AMF may determine that a corresponding session has been released, and may process the request received in step 1230. Alternatively, the AMF may inform the old SMF that the context processing has failed, so that the old SMF may perform subsequent procedures.

Figure 13:
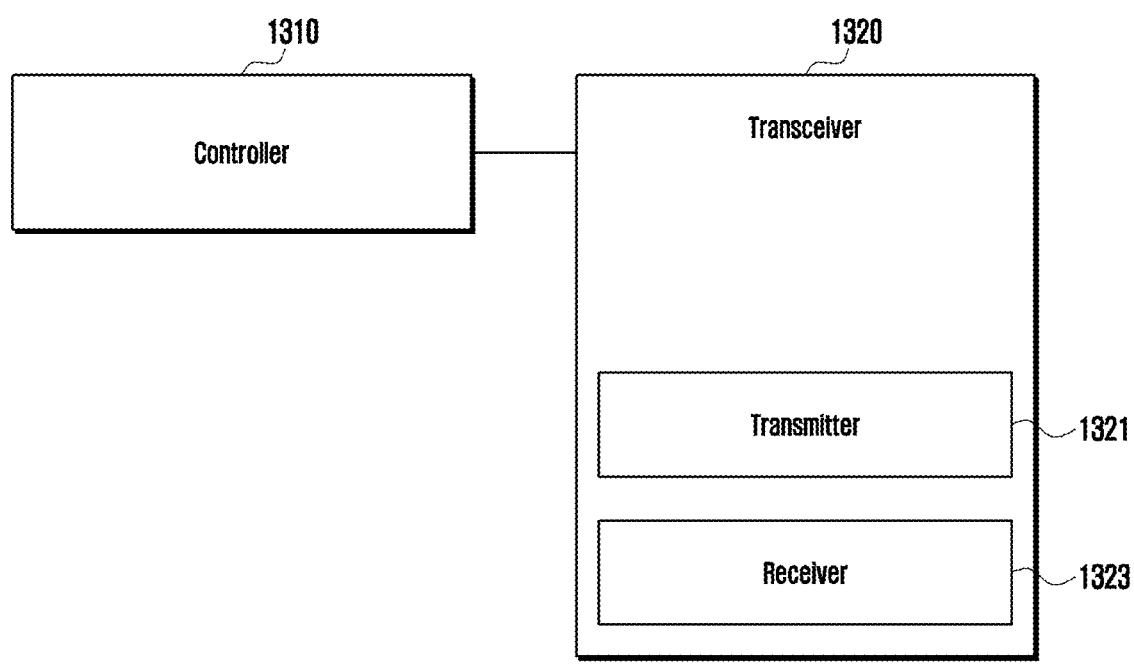
FIG. 13 illustrates a diagram of the configuration of a terminal according to the disclosure.

FIG. 13 illustrates a diagram of the configuration of a terminal according to the disclosure.

Referring to FIG. 13, a terminal according to an embodiment may include a transceiver 1320 and a controller 1310 that controls the overall operation of the terminal. In addition, the transceiver 1320 may include a transmitter 1321 and a receiver 1323.

The transceiver 1320 may transmit and receive signals to and from other network entities.

The controller 1310 may perform control such that the terminal performs any one of the operations described in the above embodiments. Meanwhile, the controller 1310 and the transceiver 1320 are not necessarily implemented as separate modules, and may be implemented as a single component in the form of a single chip. In addition, the controller 1310 and the transceiver 1320 may be electrically connected. In addition, for example, the controller 1310 may be a circuit, an application-specific circuit, or at least one processor. Further, the operations of the terminal may be realized by providing a memory device storing corresponding program code to any component inside the terminal.

Figure 14:
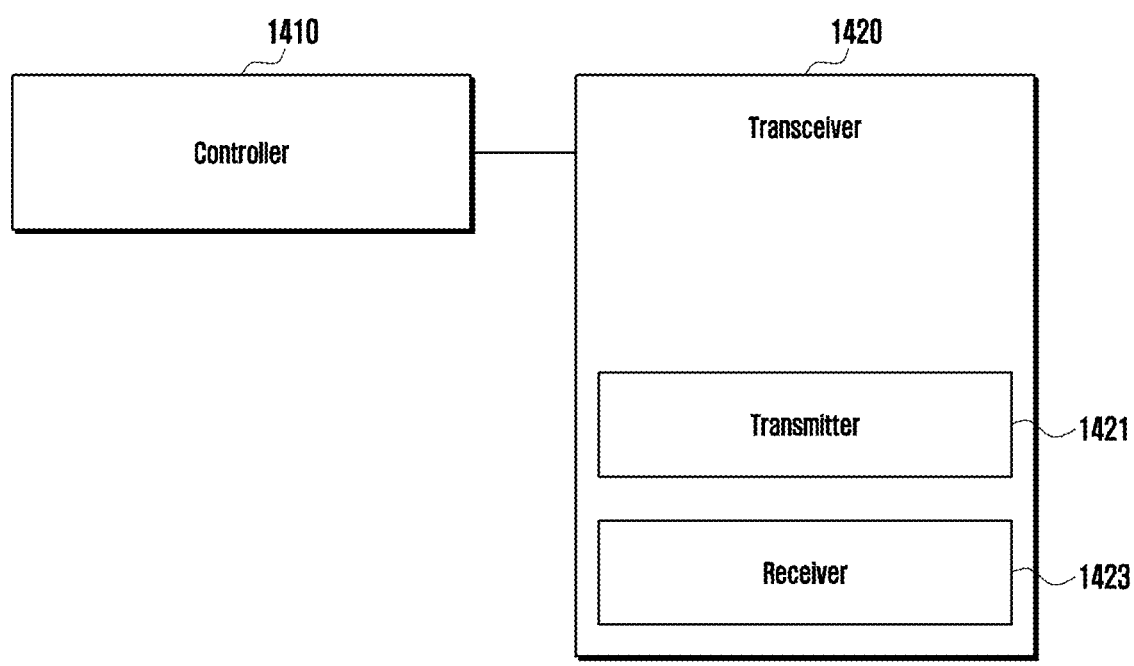
FIG. 14 illustrates a diagram of the configuration of a network entity according to the disclosure.

FIG. 14 illustrates a diagram of the configuration of a network entity according to the disclosure.

The network entity of the disclosure encompass a network function according to the implementation of a system.

Referring to FIG. 14, a network entity according to an embodiment may include a transceiver 1420 and a controller 1410 that controls the overall operation of the network entity. In addition, the transceiver 1420 may include a transmitter 1421 and a receiver 1423.

The transceiver 1420 may transmit and receive signals to and from other network entities.

The controller 1410 may perform control such that the network entity performs any one of the operations described in the above embodiments. Meanwhile, the controller 1410 and the transceiver 1420 are not necessarily implemented as separate modules, and may be implemented as a single component in the form of a single chip. In addition, the controller 1410 and the transceiver 1420 may be electrically connected. In addition, for example, the controller 1410 may be a circuit, an application-specific circuit, or at least one processor. Further, the operations of the network entity may be realized by providing a memory device storing corresponding program code to any component inside the network entity.

The network entity may be any one of a base station (RAN), an AMF, an SMF, a UPF, an NF, an NEF, an NRF, a CF, an NSSF, a UDM, an AF, an AUSF, an SCP, a UDSF, a context storage, OAM, an EMS, a configuration server, and an ID management server.

It should be noted that the configuration diagrams, the diagrams illustrating examples of a method of transmitting control/data signals, the diagrams illustrating examples of operation procedures, and the like illustrated in FIGS. 1 to 14 are not intended to limit the scope of the disclosure. That is, the components, entities, or operation steps described in FIGS. 1 to 14 should not be interpreted as essential elements for the implementation of the disclosure, and the disclosure can be implemented using only some of the elements without impairing the subject matter of the disclosure.

The above-described operations of the base station or the terminal may be realized by providing a memory device storing corresponding program code to any component inside the base station or the terminal device. That is, the controller of the base station or the terminal device may read out and execute program code stored in the memory device using a processor or a central processing unit (CPU), thereby performing the above-described operations.

The various components and modules of the entity, the base station, or the terminal described herein may be operated using hardware circuits, for example, complementary metal oxide semiconductor-based logic circuits, firmware, and hardware circuits such as a combination of software and/or hardware and firmware and/or software embedded in a machine-readable medium. For example, various electrical structures and methods may be implemented using transistors, logic gates, and electrical circuits such as customized semiconductors.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an access and mobility management function (AMF) in a communication system, the method comprising:

receiving, from a first session management function (SMF), a first message to transfer a session management (SM) context to a second SMF;

transmitting, to the second SMF, a second message for requesting the second SMF to receive the SM context from the first SMF;

starting a timer upon transmitting the second message; and receiving, from the second SMF, a third message as a response to the second message before expiring the timer, wherein the method further comprises:

receiving a service request from a terminal for a protocol data unit (PDU) session associated with the SM context, before receiving the third message; and delaying a transaction of the service request with the second SMF until receiving the third message.

2. The method of claim 1, further comprising:

determining that an SM context transfer procedure is failed in case that the timer expires before receiving the third message.

3. The method of claim 1, wherein the first message includes information for indicating of transferring the SM context.

4. The method of claim 1, wherein the third message indicates that a context creation process is completed.

5. The method of claim 1, further comprising:

receiving, from another AMF, a user equipment (UE) context transfer request due to a terminal mobility, before receiving the third message; and delaying a transaction of the UE context transfer request with the second SMF until receiving the third message.

6. The method of claim 1, wherein the first message comprises a Nsmf_PDUSession_SMContextStatusNotify message, the second message comprises a Nsmf_PDUSession_CreateSMContext request message, and the third message comprises a Nsmf_PDUSession_CreateSMContext response message.

7. The method of claim 1, wherein the transmitting the second message further comprises:

selecting the second SMF based on the first message.

8. An access and mobility management function (AMF) in a communication system, the AMF comprising:

a transceiver; and a controller configured to:

receive, from a first session management function (SMF) via the transceiver, a first message to transfer a session management (SM) context to a second SMF, transmit, to the second SMF via the transceiver, a second message for requesting the second SMF to receive the SM context from the first SMF, start a timer upon transmitting the second message, and receive, from the second SMF via the transceiver, a third message as a response to the second message before expiring the timer, wherein the controller is further configured to:

receive, via the transceiver, a service request from a terminal for a protocol data unit (PDU) session associated with the SM context, before receiving the third message, and delay a transaction of the service request with the second SMF until receiving the third message.

9. The AMF of claim 8, wherein the controller is further configured to:

determine that an SM context transfer procedure is failed in case that the timer expires before receiving the third message.

10. The AMF of claim 8,
wherein the first message includes information for indicating of transferring the SM context.

11. The AMF of claim 8,
wherein the third message indicates that a context creation process is completed.

12. The AMF of claim 8, wherein the controller is further configured to:
receive, from another AMF via the transceiver, a user equipment (UE) context transfer request due to a terminal mobility, before receiving the third message, and
delay a transaction of the UE context transfer request with the second SMF until receiving the third message.

13. The AMF of claim 8,
wherein the first message comprises a Nsmf_PDUSession_SMContextStatusNotify message, the second message comprises a Nsmf_PDUSession_CreateSMContext request message, and the third message comprises a Nsmf_PDUSession_CreateSMContext response message.

14. The AMF of claim 8, wherein the controller is further configured to:
select the second SMF based on the first message.

* * * * *